(12) United States Patent
Rivas et al.

(10) Patent No.: US 12,449,279 B2
(45) Date of Patent: Oct. 21, 2025

(54) DYNAMIC RESOLUTION SENSOR

(71) Applicant: Allegro MicroSystems, LLC, Manchester, NH (US)

(72) Inventors: Manuel Rivas, Ciudad de Buenos Aires (AR); Leandro Fuentes, Caba (AR); Javier Cuneo, Buenos Aires (AR); Nicolás Rigoni, Manchester, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 156 days.

(21) Appl. No.: 18/435,241

(22) Filed: Feb. 7, 2024

(65) Prior Publication Data

US 2025/0251257 A1    Aug. 7, 2025

(51) Int. Cl.
  *G01D 5/14*  (2006.01)
  *G01P 3/487* (2006.01)
  (Continued)

(52) U.S. Cl.
  CPC ............... *G01D 5/14* (2013.01); *G01P 3/487* (2013.01); *G01P 3/489* (2013.01); *G01R 33/06* (2013.01)

(58) Field of Classification Search
  CPC ...... G01P 3/42; G01P 3/44; G01P 3/48; G01P 3/481; G01P 3/487; G01P 3/489;
  (Continued)

(56) References Cited

U.S. PATENT DOCUMENTS 3,304,434 A   2/1967  Koster
4,225,939 A   9/1980  Yashiro
(Continued)

FOREIGN PATENT DOCUMENTS

DE   25 18 054    11/1976
DE   40 31 560    4/1992
(Continued)

OTHER PUBLICATIONS

European Intention to Grant dated Mar. 11, 2025 for European Application No. EP23174177.8; 7 Pages.
(Continued)

*Primary Examiner* — Huy Q Phan
*Assistant Examiner* — David B Frederiksen
(74) *Attorney, Agent, or Firm* — Daly, Crowley, Mofford & Durkee, LLP

(57) ABSTRACT

According to aspects of the disclosure, a method is provided for use in a sensor, the method comprising: detecting that a frequency of a first signal is in a first range, the first signal being generated, at least in part, by one or more first magnetic field sensing elements, the first signal being generated in response to a magnetic field that is associated with a rotating target, the rotating target including a plurality of pole pairs; identifying a first resolution that corresponds to the first range and causing the first resolution to become a current resolution of the sensor; and transmitting a data stream in accordance with the current resolution of the sensor, wherein transmitting the data stream includes: (i) transmitting a plurality of speed pulses that encode a speed of the rotating target, and (ii) transmitting a plurality of data pulse sets.

28 Claims, 11 Drawing Sheets

(51) Int. Cl.
*G01P 3/489* (2006.01)
*G01R 33/06* (2006.01)

(58) Field of Classification Search
CPC .. G01R 33/02; G01R 33/06–098; G01D 5/12; G01D 5/14–16
See application file for complete search history.

(56) References Cited

U.S. PATENT DOCUMENTS

| | | | |
|---|---|---|---|
| 4,283,679 A | 8/1981 | Ito et al. |
| 4,513,403 A | 4/1985 | Troy |
| 4,642,555 A | 2/1987 | Swartz et al. |
| 4,649,796 A | 3/1987 | Schmidt |
| 4,893,027 A | 1/1990 | Kammerer et al. |
| 5,220,207 A | 6/1993 | Kovalcik et al. |
| 5,244,834 A | 9/1993 | Suzuki et al. |
| 5,332,956 A | 7/1994 | Oh |
| 5,486,759 A | 1/1996 | Seiler et al. |
| 5,696,790 A | 12/1997 | Graham et al. |
| 5,781,005 A | 7/1998 | Vig et al. |
| 6,181,127 B1 | 1/2001 | Wallrafen |
| 6,212,783 B1 | 4/2001 | Ott et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,242,908 B1 | 6/2001 | Scheller et al. |
| 6,278,269 B1 | 8/2001 | Vig et al. |
| 6,288,567 B1 | 9/2001 | Fink |
| 6,297,627 B1 | 10/2001 | Towne et al. |
| 6,339,322 B1 | 1/2002 | Loreck et al. |
| 6,492,804 B2 | 12/2002 | Tsuge et al. |
| 6,525,531 B2 | 2/2003 | Forrest et al. |
| 6,542,847 B1 | 4/2003 | Lohberg et al. |
| 6,653,968 B1 | 11/2003 | Schneider |
| 6,687,644 B1 | 2/2004 | Zinke et al. |
| 6,815,944 B2 | 11/2004 | Vig et al. |
| 6,968,484 B2 | 11/2005 | Hummel |
| 7,026,808 B2 | 4/2006 | Vig et al. |
| 7,091,876 B2 | 8/2006 | Steger |
| 7,199,579 B2 | 4/2007 | Scheller et al. |
| 7,295,000 B2 | 11/2007 | Werth |
| 7,319,418 B2 | 1/2008 | Fink |
| 7,345,468 B2 | 3/2008 | Okada et al. |
| 7,362,094 B2 | 4/2008 | Voisine et al. |
| 7,365,530 B2 | 4/2008 | Bailey et al. |
| 7,592,801 B2 | 9/2009 | Bailey et al. |
| 7,800,389 B2 | 9/2010 | Friedrich et al. |
| 7,923,996 B2 | 4/2011 | Doogue et al. |
| 8,030,918 B2 | 10/2011 | Doogue et al. |
| 8,089,270 B2 | 1/2012 | Scheller et al. |
| 8,183,982 B2 | 5/2012 | Scherr |
| 8,447,556 B2 | 5/2013 | Friedrich et al. |
| 8,519,819 B2 | 8/2013 | Scherr |
| 8,542,010 B2 | 9/2013 | Cesaretti et al. |
| 8,577,634 B2 | 11/2013 | Donovan et al. |
| 8,624,588 B2 | 1/2014 | Vig et al. |
| 8,680,846 B2 | 3/2014 | Cesaretti et al. |
| 8,754,640 B2 | 6/2014 | Vig et al. |
| 8,818,749 B2 | 8/2014 | Friedrich et al. |
| 8,860,404 B2 | 10/2014 | Dwyer et al. |
| 8,922,331 B2 | 12/2014 | Scherr |
| 8,948,280 B2 | 2/2015 | Hammerschmidt et al. |
| 8,994,369 B2 | 3/2015 | Vig et al. |
| 9,068,859 B2 | 6/2015 | Dwyer et al. |
| 9,151,771 B2 | 10/2015 | Vig et al. |
| 9,151,807 B2 | 10/2015 | Friedrich et al. |
| 9,172,565 B2 | 10/2015 | Cadugan et al. |
| 9,201,122 B2 | 12/2015 | Cesaretti et al. |
| 9,210,015 B2 | 12/2015 | Scherr et al. |
| 9,222,988 B2 | 12/2015 | Zhang |
| 9,222,990 B2 | 12/2015 | Dwyer et al. |
| 9,300,235 B2 | 3/2016 | Ng et al. |
| 9,444,613 B2 | 9/2016 | Hammerschmidt et al. |
| 9,455,849 B2 | 9/2016 | Scherr et al. |
| 9,664,748 B2 | 5/2017 | Friedrich et al. |
| 9,667,409 B2 | 5/2017 | Scherr |
| 9,739,846 B2 | 8/2017 | Petrie et al. |
| 9,806,650 B1 | 10/2017 | Chu et al. |
| 9,810,519 B2 | 11/2017 | Taylor et al. |
| 9,970,996 B2 | 5/2018 | Fernandez et al. |
| 10,101,410 B2 | 10/2018 | Latham et al. |
| 10,216,559 B2 | 2/2019 | Fernandez |
| 10,326,621 B1 | 6/2019 | Geisler et al. |
| 10,436,606 B2 | 10/2019 | Kerdraon et al. |
| 10,473,486 B2 | 11/2019 | Doogue et al. |
| 10,480,957 B2 | 11/2019 | Kerdraon et al. |
| 10,481,218 B2 | 11/2019 | Prentice et al. |
| 10,495,485 B2 | 12/2019 | Burdette et al. |
| 10,495,700 B2 | 12/2019 | Prentice et al. |
| 10,571,301 B2 | 2/2020 | Doogue et al. |
| 10,598,514 B2 | 3/2020 | Pepka et al. |
| 10,656,170 B2 | 5/2020 | Lim et al. |
| 10,700,848 B2 | 6/2020 | Scherr |
| 10,747,708 B2 | 8/2020 | Kozomora et al. |
| 10,782,366 B2 | 9/2020 | Stewart |
| 11,029,176 B2 | 6/2021 | Geiger et al. |
| 11,032,100 B2 | 6/2021 | Scherr |
| 11,125,590 B2 | 9/2021 | Geiger et al. |
| 11,264,934 B2 | 3/2022 | Haselhuhn, Jr. et al. |
| 11,368,533 B2 | 6/2022 | Kozomora et al. |
| 11,686,597 B2 | 6/2023 | Weiland et al. |
| 11,811,569 B2 | 11/2023 | Ferrer et al. |
| 2001/0002791 A1 | 6/2001 | Tsuge et al. |
| 2001/0009367 A1 | 7/2001 | Seitzer et al. |
| 2002/0027488 A1 | 3/2002 | Hayat-Dawoodi et al. |
| 2003/0001563 A1 | 1/2003 | Turner |
| 2003/0141862 A1 | 7/2003 | Vig et al. |
| 2004/0062362 A1 | 4/2004 | Matsuya |
| 2004/0135220 A1 | 7/2004 | Goto |
| 2005/0120782 A1 | 6/2005 | Kishibata et al. |
| 2005/0179429 A1 | 8/2005 | Lohberg |
| 2005/0225318 A1 | 10/2005 | Bailey et al. |
| 2007/0088869 A1 | 4/2007 | Kadota |
| 2007/0118327 A1* | 5/2007 | Courtney ................ G01P 3/489 702/142 |
| 2009/0058404 A1 | 3/2009 | Kurumado |
| 2009/0251134 A1 | 10/2009 | Uenoyama |
| 2010/0026279 A1 | 2/2010 | Vig et al. |
| 2011/0018533 A1 | 1/2011 | Cesaretti et al. |
| 2011/0250862 A1 | 10/2011 | Schliwa-Bertling et al. |
| 2012/0007589 A1* | 1/2012 | Okada .................. G01R 33/07 324/207.2 |
| 2012/0177096 A1 | 7/2012 | Yano et al. |
| 2013/0046488 A1 | 2/2013 | Donovan et al. |
| 2013/0335069 A1 | 12/2013 | Vig et al. |
| 2013/0335074 A1 | 12/2013 | Dwyer et al. |
| 2014/0210641 A1 | 7/2014 | Hammerschmidt |
| 2014/0333295 A1 | 11/2014 | Fernandez et al. |
| 2014/0375312 A1 | 12/2014 | Friedrich et al. |
| 2015/0185279 A1 | 7/2015 | Milano et al. |
| 2015/0236746 A1 | 8/2015 | Scheinkerman et al. |
| 2015/0236869 A1 | 8/2015 | Vreeland et al. |
| 2015/0268263 A1 | 9/2015 | Rasbornig |
| 2016/0025820 A1 | 1/2016 | Scheller et al. |
| 2016/0123771 A1 | 5/2016 | David et al. |
| 2016/0123780 A1 | 5/2016 | Snyder et al. |
| 2016/0139230 A1 | 5/2016 | Petrie et al. |
| 2016/0178714 A1 | 6/2016 | Fautz |
| 2017/0219383 A1 | 8/2017 | Umehara et al. |
| 2017/0219662 A1 | 8/2017 | Prentice et al. |
| 2017/0222738 A1 | 8/2017 | Hammerschmidt et al. |
| 2017/0307407 A1 | 10/2017 | Judkins, III et al. |
| 2017/0315146 A1 | 11/2017 | Koeck et al. |
| 2017/0319097 A1 | 11/2017 | Amthor et al. |
| 2017/0336225 A1 | 11/2017 | Burdette et al. |
| 2018/0024214 A1 | 1/2018 | Bhat et al. |
| 2018/0067174 A1 | 3/2018 | Prentice et al. |
| 2018/0136999 A1 | 5/2018 | Fernandez |
| 2018/0174441 A1 | 6/2018 | Hainz et al. |
| 2020/0049729 A1 | 2/2020 | Jeon et al. |
| 2020/0088550 A1* | 3/2020 | Lorber ............... G01R 33/0029 |
| 2020/0244481 A1 | 7/2020 | Scherr |
| 2021/0262831 A1 | 8/2021 | Foletto et al. |
| 2022/0239462 A1 | 7/2022 | Casu et al. |

(56) References Cited

U.S. PATENT DOCUMENTS

| | | | |
|---|---|---|---|
| 2023/0378977 | A1 | 11/2023 | Bastien et al. |
| 2023/0400477 | A1 | 12/2023 | Friedrich et al. |
| 2024/0110777 | A1 | 4/2024 | Casu et al. |

FOREIGN PATENT DOCUMENTS

| | | | |
|---|---|---|---|
| DE | 196 34 715 A1 | 3/1998 | |
| DE | 19634714 B4 | 3/1998 | |
| DE | 196 50 935 A1 | 6/1998 | |
| DE | 198 38 433 | 3/1999 | |
| DE | 19900774 A1 | 12/1999 | |
| DE | 199 61 504 A1 | 6/2001 | |
| DE | 10 2017 125562 | 5/2018 | |
| DE | 102019009169 | 12/2020 | |
| DE | 10 2019 133440 | 6/2021 | |
| EP | 0158645 | 2/1988 | |
| EP | 0 944 888 A2 | 9/1999 | |
| EP | 1490772 | 12/2004 | |
| EP | 1 580 560 A1 | 9/2005 | |
| EP | 1 662 353 A1 | 5/2006 | |
| JP | 63-300911 | 12/1988 | |
| JP | H 02-116753 | 5/1990 | |
| JP | H 02-149013 | 6/1990 | |
| JP | H 03-29817 | 2/1991 | |
| JP | H06-273437 | 9/1994 | |
| JP | 07-012582 | 1/1995 | |
| JP | H 09-49740 | 2/1997 | |
| JP | 10-332725 | 12/1998 | |
| JP | 11-0634363 | 3/1999 | |
| JP | 2001-043475 | 2/2001 | |
| JP | 2001-165951 | 6/2001 | |
| JP | 2002-117500 | 4/2002 | |
| JP | 2002-357920 | 12/2002 | |
| JP | 4093381 | 3/2008 | |
| JP | 4880874 | 2/2012 | |
| JP | 2015-228171 A | 12/2015 | |
| WO | WO 88/09026 | 11/1988 | |
| WO | WO 9825148 A2 | 6/1998 | |
| WO | WO 99/49322 | 9/1999 | |
| WO | WO 01/74139 A2 | 10/2001 | |
| WO | WO 03/069358 A2 | 8/2003 | |
| WO | WO 2004/010437 | 1/2004 | |
| WO | WO 2005/013363 A2 | 2/2005 | |
| WO | WO 2008/145662 A1 | 12/2008 | |
| WO | WO 2009/012006 | 1/2009 | |
| WO | WO 2009/121352 | 10/2009 | |
| WO | WO 2010/014309 A1 | 2/2010 | |
| WO | WO 2010/150416 | 12/2010 | |

OTHER PUBLICATIONS

U.S. Notice of Allowance dated Apr. 15, 2025 for U.S. Appl. No. 17/663,930; 10 Pages.
Amendment Under Rule 312 filed on Apr. 24, 2025 for U.S. Appl. No. 17/663,930; 4 Pages.
Office Action dated Feb. 12, 2025 for U.S. Appl. No. 18/355,623, 23 pages.
Response to U.S. Non-Final Office Action dated Dec. 10, 2024 for U.S. Appl. No. 17/663,930; Response Filed Feb. 14, 2025; 9 Pages.
Response to U.S. Non-Final Office Action dated Feb. 12, 2025 for U.S. Appl. No. 18/335,623; Response Filed Feb. 24, 2025; 11 Pages.
Ali, "Speed Sensor Protocols", AN296246, MCO-0001126, P0160; Allegro MicroSystems, LLC, Aug. 2021; 11 pages.
Extended European Search Report dated May 9, 2025, for European Patent Application No. 24219412.4; 9 pages.
Notice of Allowance dated May 7, 2025 for U.S. Appl. No. 18/355,623, 9 pages.
Office Action dated Jun. 3, 2025, for U.S. Appl. No. 18/426,449; 18 pages.
Office Action dated Jun. 3, 2025, for U.S. Appl. No. 18/426,449; Response filed Jun. 11, 2025; 10 pages.
U.S. Appl. No. 18/426,449, filed Jan. 30, 2024, Veilleux.
U.S. Appl. No. 18/391,834, filed Dec. 21, 2023, Haselhuhn Jr.
U.S. Appl. No. 18/337,562, filed Jun. 20, 2023, Dono, et al.
U.S. Appl. No. 62/337,478, filed May 17, 2016, Burdette et al.
Allegro MicroSystems Application Note "AN296246, Speed Sensor Protocols", Allegro MicroSystems, Aug. 2, 2021, 11 pages.
Allegro MicroSystems Datasheet "A19350 High-Accuracy GMR Wheel Speed and Direction Sensor IC"; Allegro MicroSystems, Nov. 16, 2018; 14 Pages.
Allegro MicroSystems Datasheet "A19360 High-Resolution GMR Wheel Speed and Distance Sensor IC", Allegro MicroSystems, Dec. 6, 2022, 18 pages.
Allegro Microsystems, Inc. Data Sheet A1341; "High Precision, Highly Programmable Linear Hall Effect Sensor IC with EEPROM, Output Protocols SENT and PWM, and Advanced Output Linearization Capabilities;" May 17, 2010; 46 pages.
Allegro Microsystems, Inc. Data Sheet ATS601LSG; "Non-TPOS, Tooth Detecting Speed Sensor;" Nov. 1, 2011; 9 pages.
Infineon Technologies; "Differential Two-Wire Hall Effect Sensor Ic;" TLE4942 Preliminary Datasheet; Jun. 2000; 12 pages.
Infineon Technologies; "High-End GMR Wheel Speed Sensor with direction detection, Asil B(D);" TLE5046iC Product Description; Jun. 2020; 14 pages.
ISO 26262-1 "Road Vehicles- Functional Safety, Part 1 Vocabulary", International Standard, Nov. 15, 2011, 30 pages.
ISO 26262-3 "Road Vehicles- Functional Safety, Part 3 Concept Phase", International Standard, Nov. 15, 2011, 32 pages.
ISO 26262-10 "Road Vehicles- Functional Safety, Part10 Guideline on ISO 26262", International Standard, Aug. 1, 2012, 96 pages.
Jeffrey et al.; "Sensor Testing Through Bias Superposition;" Science Direct, Sensors and Actuators, A 136; Feb. 6, 2007, 15 pages.
Lequesne et al.; "High-Accuracy Magnetic Position Encoder Concept;" IEEE Transactions on Industry Applications; vol. 35, No. 3; May/Jun. 1999; 9 pages.
Pancik, et al. "Open source based peripherals for automotive electronic control unit"; EAI Endorsed Transactions on Scalable Information Systems; Jun. 19, 2018; 7 Pages.
Robert Bosch GMBH Stuttgart; "Active Sensor for ABS/ASR/VDC-Systems with 2-Wire-Current Interface;" Specification TLE4941/TLE4942; Version 5; Jul. 25, 2000; 44 pages.
PCT Search Report dated Nov. 19, 2003 for PCT Pat. App. No. PCT/US03/02489; 5 pages.
PCT Invitation to Pay Additional Fees with Partial Search Report; dated Oct. 2, 2003 for PCT Pat. App. No. PCT/US03/02489; 3 pages.
EP Office Action dated Mar. 2, 2005 for EP 03 710 766.1; 8 pages.
EP Response to Office Action submitted May 2009 for EP 03 710 766.1; 19 pages.
EP Summons to Oral Proceedings dated Apr. 30, 2009 for EP 03 710 766.1; 4 pages.
EP Communication from the Board of Appeal for EP 03 710 766.1; dated May 26, 2009; 52 pages.
JP Official Action dated Apr. 7, 2008 for JP 2003-568426; 5 pages.
JP Response to Official Action dated Sep. 22, 2008 for JP 2003-568426; 14 pages.
JP Official Action dated Dec. 12, 2008 for JP 2003-568426; 4 pages.
JP Response to Official Action dated Mar. 25, 2009 for JP 2003-568426; 8 pages.
JP Notice of Rejection dated Nov. 16, 2010; for JP 2003-568426; 5 pages.
JP Response to Notice of Rejection dated May 13, 2011; for JP 2003-568426; 27 pages.
JP Office Action dated Aug. 29, 2011; for JP 2003-568426; 9 pages.
JP Response to Notice of Rejection; filed Oct. 11, 2011; for JP 2003-568426; 6 pages.
JP Notice of Allowance dated Nov. 8, 2011; for JP 2003-568426; 3 pages.
EP Response to Written Opinion; dated Mar. 9, 2011; for EP Pat. App. No. 09789890.2; 11 pages.
CN Office Action dated May 3, 2012; for CN Pat. App. No. 200980189766.7; 13 pages.
CN Response to Office Action filed on Oct. 18, 2012; for CN Pat. App. No. 200980129766.7; 10 pages.

(56) References Cited

OTHER PUBLICATIONS

Letter to NTD Patent and Trademark Agency; dated Aug. 29, 2012; Chinese Pat. App. No. 200980129766.7; including U.S. Amendment filed May 19, 2012; 20 pages.
Letter from NTD Patent & Trademark Agency Limited; dated Feb. 6, 2013; for CN Pat. App. No. 200980129766.7; 2 pages.
Chinese Office Action dated Jan. 18, 2013; for CN Pat. App. No. 200980129766.7; 8 pages.
Letter to NTD Patent & Trademark Agency Limited; dated Feb. 6, 2013; for CN Pat. App. No. 200980129766.7; 2 pages.
Chinese Notice of Allowance; dated Mar. 6, 2013; for Chinese Pat. App. No. 200980129766.7; 4 pages.
Office Action dated May 12, 2011; for U.S. Appl. No. 12/183,367; 17 pages.
Response to Office Action filed Aug. 10, 2011; for U.S. Appl. No. 12/183,367; 13 pages.
Office Action dated Oct. 20, 2011; for U.S. Appl. No. 12/183,367; 9 pages.
Response to Office Action filed Jan. 17, 2012; for U.S. Appl. No. 12/183,367; 15 pages.
Restriction Requirement dated Apr. 12, 2012; for U.S. Appl. No. 12/183,367; 6 pages.
Response to Restriction Requirement filed May 9, 2012; for U.S. Appl. No. 12/183,367; 2 pages.
Final Office Action; dated May 2, 2013; for U.S. Appl. No. 12/183,367; 15 pages.
Response to Final Office Action dated Jun. 19, 2013 for U.S. Appl. No. 12/183,367 8 pages.
Final Office Action dated Jul. 1, 2013; for U.S. Appl. No. 12/183,367; 7 pages.
Response to Final Office Action dated Aug. 27, 2013 for U.S. Appl. No. 12/183,367; 13 pages.
Notice of Allowance dated Sep. 6, 2013 for U.S. Appl. No. 12/183,367; 7 pages.
U.S. Appl. No. 12/183,367; Part 1.
U.S. Appl. No. 12/183,367; Part 2.
U.S. Appl. No. 12/183,367; Part 3.
U.S. Appl. No. 12/183,367; Part 4.
U.S. Appl. No. 12/183,367; Part 5.
U.S. Appl. No. 12/183,367; Part 6.
U.S. Appl. No. 12/183,367; Part 7.
U.S. Appl. No. 12/183,367; Part 8.
U.S. Appl. No. 12/183,367; Part 9.
Notice of Allowance dated Feb. 12, 2014 for U.S. Appl. No. 13/526,106; 10 pages.
PCT Search Report and Written Opinion of the ISA; dated Aug. 12, 2013; for PCT Pat. App. No. PCT/US2013/044025; 12 pages.
PCT International Preliminary Report on Patentability dated Dec. 31, 2014 for PCT Pat. App. No. PCT/US2013/044025; 10 pages.
Voluntary Amendment filed Feb. 7, 2018 for Korean Application No. 10-2014-7036300; 12 pages.
KR Notice to Submit a Response dated May 29, 2019 for KR Pat. Appl. No. 10-2014-7036300; 8 pages.
Response Korean with English translation of bibliographic information dated Jul. 26, 2019 for Korean Application No. 10-2014-7036300; 37 pages.
Letter from 21$^{st}$ Century Patent & Law Firm dated Jun. 28, 2019 for Korean Application No. 10-2014-7036300; 3 pages.
Notice of Allowance dated Sep. 30, 2019 for Korean Application No. 10-2014-7036300; 4 pages.
Response to Written Opinion filed Jun. 29, 2015 for European Application No. 13729203.3; 43 pages.
Intention of Grant dated Jan. 19, 2017 for European Application No. 13729203.3; 2 pages.
Office Action dated April 19, 2018 for U.S. Appl. No. 15/350,400; 18 pages.
Response to Office Action filed on May 9, 2018 2018 for U.S. Appl. No. 15/350,400; 18 pages.
Final Office Action dated Aug. 6, 2018 for U.S. Appl. No. 15/350,400; 24 pages.
Response to Final Office Action filed on Nov. 5, 2018 2018 for U.S. Appl. No. 15/350,400; 18 pages.
Notice of Allowance dated Nov. 21, 2018 for U.S. Appl. No. 15/350,400; 7 pages.
PCT International Search Report and Written Opinion dated Mar. 8, 2018 for International Application No. PCT/US2017/059148; 16 pages.
PCT International Preliminary Report dated May 23, 2019 for Intl. Pat. Appl. No. PCT/US2017/059148; 9 pages.
European 161/162 Communication dated Jun. 6, 2019 for European Application No. 17809079.1; 3 Pages.
Response to Office Action filed on Dec. 16, 2019 for European Application No. 17809079.1; 28 pages.
Office Action dated Jun. 26, 2019 for U.S. Appl. No. 15/655,400, 14 pages.
Response to Office Action dated Jun. 26, 2019, filed on Sep. 9, 2019 for U.S. Appl. No. 15/655,400, 11 pages.
Notice of Allowance dated Dec. 18, 2019 for U.S. Appl. No. 15/655,400, 8 pages.
Office Action dated Dec. 31, 2019 for U.S. Appl. No. 15/982,268, 17 pages.
Response to Office Action dated Dec. 31, 2019, filed on Feb. 12, 2020 for U.S. Appl. No. 15/982,268, 10 pages.
Notice of Allowance dated Apr. 1, 2020 for U.S. Appl. No. 15/982,268, 12 pages.
Restriction Requirement Aug. 15, 2024, for U.S. Appl. No. 17/663,930; 10 pages.
Response to Restriction Requirement Aug. 15, 2024, filed on Sep. 26, 2024 for U.S. Appl. No. 17/663,930; 1 page.
Office Action dated Dec. 10, 2024 for U.S. Appl. No. 17/663,930; 11 pages.
Partial European Search Report dated Sep. 27, 2023 for European Application No. EP23174177.8; 15 Pages.
Extended European Search Report dated Jan. 8, 2024 for European Application No. EP23174177.13; 13 Pages.
Response to Extended European Search Report (EESR) dated Jan. 8, 2024 for European Application No. 23174177.8; Response filed Aug. 7, 2024; 66 Pages.
Final Office Action dated Aug. 11, 2025, for U.S. Appl. No. 18/426,449; 23 pages.

* cited by examiner

LEGEND
T$_S$ – SPEED PULSE
TW – TRANSMISSION WINDOW

302

| PULSE-ENCODING FREQUENCY | SPEED @2X RESOLUTION | AVAILABLE DATA BITS |
|---|---|---|
| <1800 Hz | 135 km/h | Bit 0 to bit 8 |
| <2000 Hz | 150 km/h | Bit 0 to bit 7 |
| <2200 Hz | 165 km/h | Bit 0 to bit 6 |
| <2400 Hz | 180 km/h | Bit 0 to bit 5 |
| <2800 Hz | 210 km/h | Bit 0 to bit 4 |
| <3200 Hz | 240 km/h | Bit 0 to bit 3 |
| <4000 Hz | 300 km/h | Bit 0 to bit 2 |
| <5000 Hz | 375 km/h | Bit 0 to bit 1 |

| PULSE-ENCODING FREQUENCY | SPEED @2X RESOLUTION | SPEED @4X RESOLUTION | SPEED @8X RESOLUTION | SPEED @R_X RESOLUTION |
|---|---|---|---|---|
| <1800 Hz | 135 km/h | 135/2 km/h | 135/4 km/h | 135/(0.5*R) km/h |
| <2000 Hz | 150 km/h | 150/2 km/h | 150/4 km/h | 150/(0.5*R) km/h |
| <2200 Hz | 165 km/h | 165/2 km/h | 165/4 km/h | 165/(0.5*R) km/h |
| <2400 Hz | 180 km/h | 180/2 km/h | 180/4 km/h | 180/(0.5*R) km/h |
| <2800 Hz | 210 km/h | 210/2 km/h | 210/4 km/h | 210/(0.5*R) km/h |
| <3200 Hz | 240 km/h | 240/2 km/h | 240/4 km/h | 240/(0.5*R) km/h |
| <4000 Hz | 300 km/h | 300/2 km/h | 300/4 km/h | 300/(0.5*R) km/h |
| <5000 Hz | 375 km/h | 375/2 km/h | 375/4 km/h | 375/(0.5*R) km/h |

FIG. 3B

| FREQUENCY OF SIGNAL 119A | 64X RES. | 32X RES. | 16X RES. | 8X RES. | 4X RES. | 2X RES. | SPEED OF TARGET 103 |
|---|---|---|---|---|---|---|---|
| 0-24 Hz | ▓ | | | | | | 1ST SPEED RANGE |
| 25-49 Hz | | | | | | | |
| 50-99 Hz | | ▓ | | | | | 2ND SPEED RANGE |
| 100-199 Hz | | | ▓ | | | | 3RD SPEED RANGE |
| 200-399 Hz | | | | ▓ | | | 4TH SPEED RANGE |
| 400-799 Hz | | | | | ▓ | | 5TH SPEED RANGE |
| 800-4999 Hz | | | | | | | |
| 5000+ Hz | | | | | | ▓ | 6TH SPEED RANGE |

FIG. 4

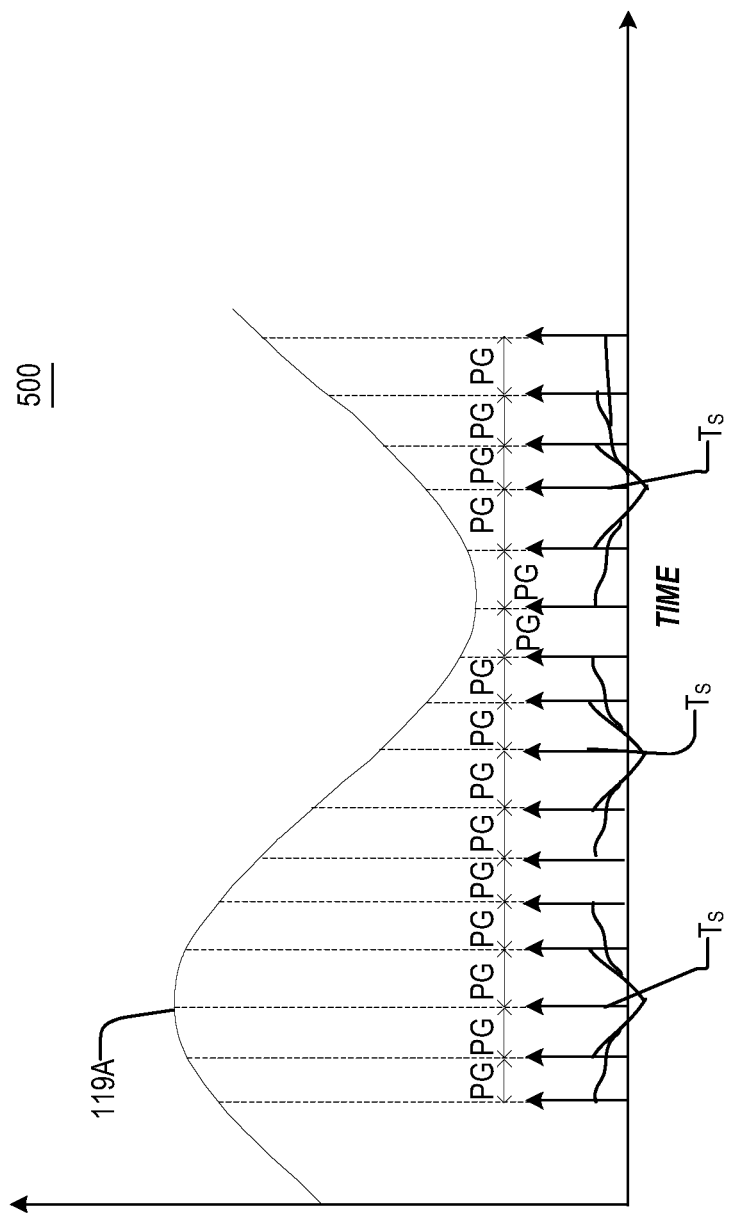

DYNAMIC RESOLUTION SENSOR

BACKGROUND

Magnetic field sensors can be used in various types of devices to measure and monitor properties of systems in a wide variety of different applications. For example, sensors have become common in products that rely on electronics in their operation, such as motor control systems and automobile control systems. In automotive applications, a Hall-based or magneto-resistive sensor is used in combination with a ring magnet to monitor and measure the wheel speed, detect direction of rotation, and provide other information to the car's electronic control unit (ECU). The ECU, in turn, may use these data for passive monitoring and display or for active control as part of an anti-lock braking system (ABS), parking assist (e.g., automatic parallel parking), and other such systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a sensor, the method comprising: detecting that a frequency of a first signal is in a first range, the first signal being generated, at least in part, by one or more first magnetic field sensing elements, the first signal being generated in response to a magnetic field that is associated with a rotating target, the rotating target including a plurality of pole pairs; identifying a first resolution that corresponds to the first range and causing the first resolution to become a current resolution of the sensor; and transmitting a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

According to aspects of the disclosure, a sensor is provided, comprising: one or more first magnetic field sensing elements configured to generate, at least in part, a first signal in response to a magnetic field that is associated with a rotating target, the rotating target including a plurality of pole pairs; and a processing circuitry configured to: detect that a frequency of the first signal is in a first range; identify a first resolution that corresponds to the first range and cause the first resolution to become a current resolution of the sensor; and transmit a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

According to aspects of the disclosure, a sensor is provided comprising: means for detecting that a frequency of a first signal is in a first range, the first signal being generated, at least in part, by one or more first magnetic field sensing elements, the first signal being generated in response to a magnetic field that is associated with a rotating target, the rotating target including a plurality of pole pairs; means for identifying a first resolution that corresponds to the first range and causing the first resolution to become a current resolution of the sensor; and means for transmitting a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

According to aspects of the disclosure, a non-transitory computer-readable medium is provided, storing one or more processor-executable instructions, which, when executed by a processing circuitry of a sensor, causes the processing circuitry to: detect that a frequency of a first signal is in a first range, the first signal being generated, at least in part, by one or more first magnetic field sensing elements, the first signal being generated in response to a magnetic field that is associated with a rotating target, the rotating target including a plurality of pole pairs; identify a first resolution that corresponds to the first range and cause the first resolution to become a current resolution of the sensor; and transmit a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3A shows a table illustrating aspects of the operation of the sensor of FIG. 1C, according to aspects of the disclosure;

FIG. 3B shows a table illustrating aspects of the operation of the sensor of FIG. 1C, according to aspects of the disclosure;

FIG. 4 shows a table illustrating aspects of the operation of the sensor of FIG. 1C, according to aspects of the disclosure;

FIG. 5A is a graph illustrating an example of a data stream that is transmitted by the sensor of FIG. 1C, according to aspects of the disclosure;

DETAILED DESCRIPTION

Figure 1A:
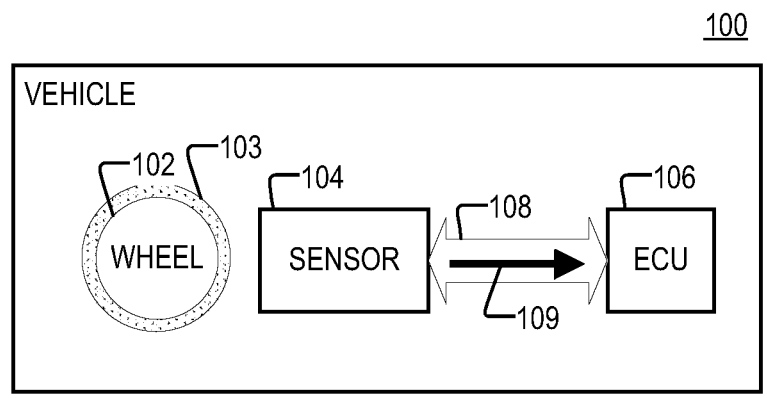
FIG. 1A is a diagram of an example of a system, according to aspects of the disclosure.

FIG. 1 is a schematic diagram of a vehicle 100, according to aspects of the disclosure. As illustrated, vehicle 100 may include a wheel 102 and a sensor 104 that is coupled to an electronic control unit (ECU) 106 via a link 108. The wheel 102 may be coupled to a target 103. Target 103 may be a ring magnet and it may be arranged to turn with the wheel 102. In operation, sensor 104 may measure the speed of rotation and/or position of the target 103 and transmit indications of the wheel speed and/or position to the ECU 106 over link 108. According to the present example, the indications of the wheel speed are transmitted using a pulse-encoded speed signal. The pulse-encoded signal is transmitted concurrently with pulse-encoded data over the same physical medium (e.g., a pair of wires). The pulse-encoded speed signal and the data pulses are part of a data stream 109 that is transmitted to ECU 106 over link 108. As is discussed further below, the speed of rotation of target 103 is encoded by varying the frequency of the speed pulses $T_S$, whereas data is encoded by using pulse-width modulation binary encoding. For example, a "narrow" data pulse may correspond to '0' and a "wide" data pulse may correspond to '1'. In one example, the data stream 109 may be formatted in accordance with the AK-protocol, as specified in the document titled Requirement Specifications for Standardized Interface for Wheel Speed Sensors with Additional Information "AK-Protokoll". However, alternative implementations are possible in which the data stream 109 is formatted in accordance with another protocol. Stated succinctly, the present disclosure is not limited to using any specific formatting of the data stream 109.

Figure 1B:
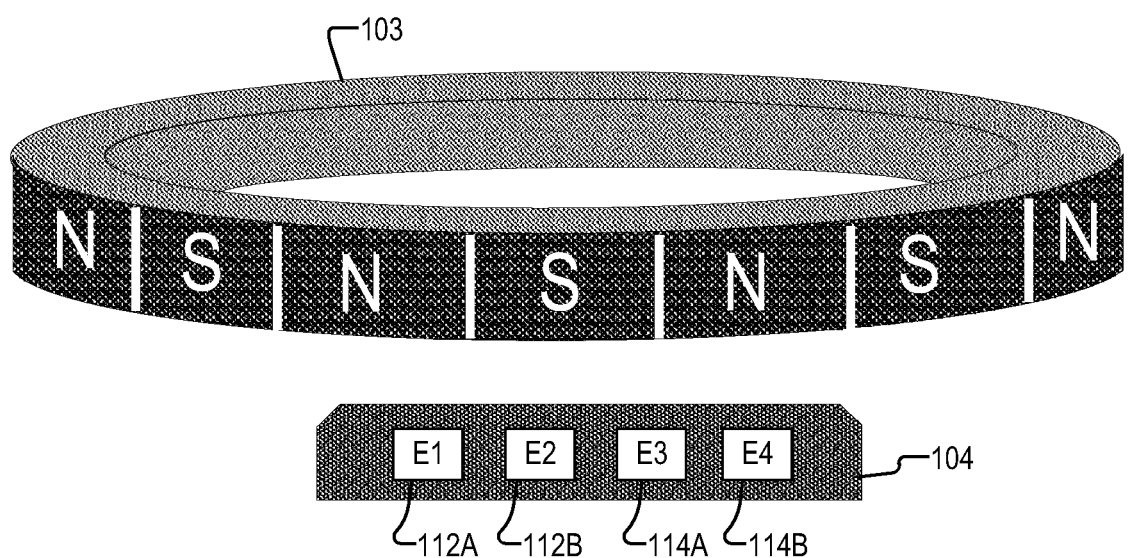
FIG. 1B is a diagram of an example of a portion of the system of FIG. 1A, according to aspects of the disclosure.

FIG. 1B shows an example of target 103 and sensor 104, according to one implementation. As illustrated, the target 103 may be a multi-pole ring magnet. Sensor 104 may be a magnetic field sensor including magnetic field sensing elements 112A-B and magnetic field sensing elements 114A-B. According to the present example, each of magnetic field sensors 112A-B and 114A-B is a giant magnetoresistance (GMR) element. However, it will be understood that the present disclosure is not limited to any specific implementation of magnetic field sensing elements 112A-B and 114A-B. For example, each of the magnetic field sensing elements 112A-B and 114A-B may be a planar Hall element, a vertical Hall element, a Circular Vertical Hall (CVH) element, a spin valve, an anisotropic magnetoresistance element (AMR), a tunneling magnetoresistance (TMR) element, a magnetic tunnel junction (MTJ), and/or any other suitable type of magnetic field sensing element. Depending on the device type and other application requirements, a magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb). Although in the example of FIG. 1B, sensor 104 is provided with two pairs of magnetic field sensing elements, alternative implementations are possible in which sensor 104 is provided with a single pair of magnetic field sensing elements (e.g., the pair including magnetic field sensing elements 112A-B) or just a single magnetic field sensing element (e.g., provided only with magnetic field sensing element 112A), or more than two pairs of magnetic field sensing elements. Stated succinctly, the present disclosure is not limited to any specific implementation of sensor 104.

Figure 1C:
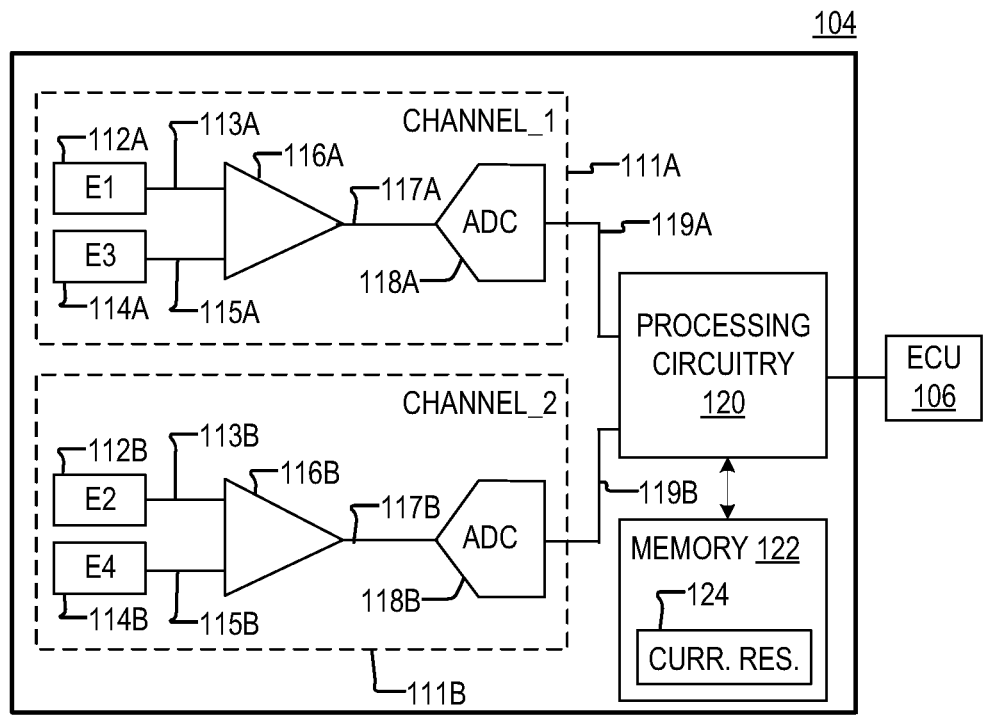
FIG. 1C is a diagram of an example of a sensor that is part of the system of FIG. 1A, according to aspects of the disclosure.

FIG. 1C is a diagram of an example of sensor 104, according to one implementation. In the example of FIG. 1C, the sensor 104 is a position and speed sensor. However, alternative implementations are possible in which the sensor 104 includes any other suitable type of magnetic field sensor. According to the example of FIG. 1C, the sensor 104 may include a channel 111A, a channel 111B, a processing circuitry 120, and a memory 122.

Channel 111A may include a sensing element 112A, a sensing element 114A, an amplifier 116A, and an analog-to-digital converter (ADC) 118A. In operation, the sensing elements 112A and 114A may generate signals 113A and 115A, respectively. The amplifier 116A may amplify the signals 113A and 115A to produce a signal 117A. The ADC 118A may digitize the signal 117A to produce a signal 119A.

Channel 111B may include a sensing element 112B, a sensing element 114B, an amplifier 116B, and an ADC 118B. In operation, the sensing elements 112B and 114B may generate signals 113B and 115B, respectively. The amplifier 116B may amplify the signals 113B and 115B to produce a signal 117B. The ADC 118B may digitize the signal 117B to produce a signal 119B.

The processing circuitry 120 may include any suitable type of digital or analog circuitry for processing signals 119A and 119B. In some, processing circuitry 120 may include one or more digital or analog filters. Additionally or alternatively, processing circuitry 120 may include one or more amplifiers, comparators, and/or other similar circuitry. Additionally or alternatively, processing circuitry may include digital circuitry, such as a general-purpose processor, a special-purpose processor, an application-specific circuit, and/or any other suitable type of processing circuitry. The processing circuitry 120 may be coupled to memory 122. Memory 122 may include any suitable type of volatile or non-volatile memory, such as an Electrically Erasable Programmable Read-Only Memory (EEPROM), a Dynamic Random-Access Memory (DRAM), a flash memory and/or any other suitable type of volatile memory.

In one aspect, memory 122 may store a variable 124 whose value indicates the current resolution of the sensor 104. The term "current resolution of sensor 104" refers to the number of pulses that are transmitted by sensor 104 in each period of signal 119A (or signal 119B) and/or for each pole pair of target 103. In one example, sensor 104 may support each of a 2× resolution, 4× resolution, 8× resolution, 16× resolution, 32× resolution, and 64× resolution. Under the nomenclature of the present disclosure, each resolution of sensor 104 is denoted by a number followed by the letter 'x'. The number is referred to as an "identifier" of the resolution. Furthermore, under the nomenclature of the present disclosure, each resolution of sensor 104 is characterized by a factor, which is equal to the identifier of the resolution divided by two. So, for example, the 2× resolution has an identifier '2' and a factor '1', the 4× resolution has an identifier of '4' and a factor of '2', the 8× resolution has an identifier of '8' and a factor of 4, the 16× resolution has an identifier of '16' and a factor of '8', the 32× resolution has an identifier of '32' and a factor of '16', and the 64× resolution has an identifier of '64' and a factor of '32'.

The identifier of any resolution of sensor 104 specifies the number of speed pulses $T_S$ that would be transmitted by the sensor in each period of signal 119A (and/or for each pole pair of target 103). For example, when the current resolution of sensor 104 is the 2× resolution, sensor 104 may output 2 speed pulses $T_S$ for each period of the signal 119A; when the current resolution of sensor 104 is the 4× resolution, sensor 104 may output 4 speed pulses $T_S$ for each period of the signal 119A; when the current resolution of sensor 104 is the 8× resolution, sensor 104 may output 8 speed pulses $T_S$ for each period of the signal 119A; when the current resolution of sensor 104 is the 16× resolution, sensor 104 may output 16 speed pulses $T_S$ for each period of the signal 119A; when the current resolution of sensor 104 is the 32× resolution, sensor 104 may output 32 speed pulses $T_S$ for each period of the signal 119A; and when the current resolution of sensor 104 is the 64× resolution, sensor 104 may output 64 speed pulses $T_S$ for each period of the signal 119A. As can be readily appreciated from FIG. 1B, the higher the resolution of sensor 104, the greater the accuracy with which the position of target 103 can be determined from the output of sensor 104.

Figure 1D:
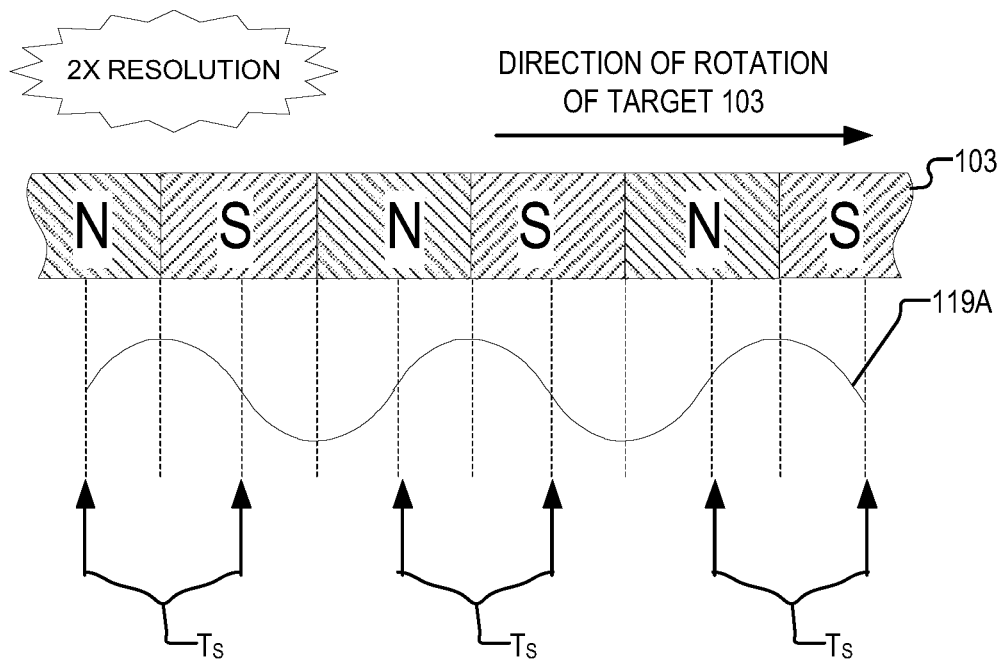
FIG. 1D is a diagram illustrating aspects of the operation of the system of FIG. 1A, according to aspects of the disclosure.

FIG. 1D is a diagram illustrating the operation of sensor 104 when the current resolution of sensor 104 is the 2× resolution. FIG. 1D illustrates that when the current resolution of sensor 104 is the 2× resolution, sensor 104 may output 2 speed pulses $T_S$ in each period of signal 119A. Furthermore, FIG. 1D illustrates that each period in signal 119A is generated over the course of a single pole pair of target 103 passing by sensor 104. As indicated in FIG. 1B, one period of signal 119A corresponds to a single pole pair of target 103 passing by sensor 104.

Figure 1E:
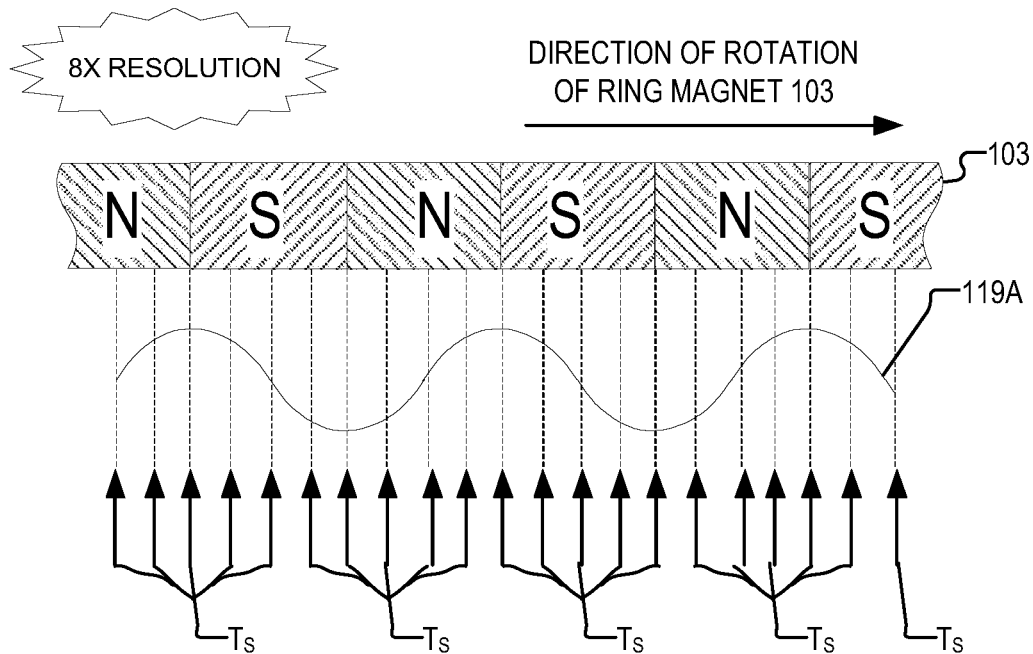
FIG. 1E is a diagram illustrating aspects of the operation of the system of FIG. 1A, according to aspects of the disclosure.

FIG. 1E is a diagram illustrating the operation of sensor 104 when the current resolution of sensor 104 is the 8× resolution. FIG. 1E illustrates that when the current resolution of sensor 104 is the 8× resolution, sensor 104 may output 8 speed pulses $T_S$ in each period of signal 119A.

Figure 2:
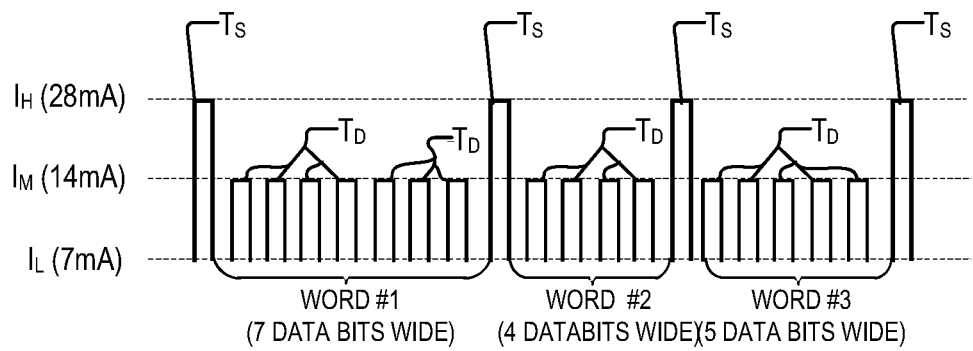
FIG. 2 is a graph illustrating an example of a data stream that is transmitted by the sensor of FIG. 1C, according to aspects of the disclosure.

FIG. 2 is a diagram of an example of a data stream 109, according to aspects of the disclosure. As illustrated, the data stream 109 may include a plurality of speed pulses $T_S$ and a plurality of data pulses $T_D$. In some implementations, each of the speed pulses $T_S$ may have a level of approximately 28 mA, and each of the data pulses $T_D$ may have a level of approximately 14 mA. The set of data pulses that is transmitted between any two consecutive pulses are herein referred to as a word. According to the present example, the data pulses $T_D$ are arranged to encode the current resolution of sensor 104. In this regard, in some implementations, each word in the data stream 109 may contain an indication of the current resolution of sensor 104. As another example, in some implementations, only the word in data stream that is transmitted immediately after the current resolution has changed may contain an indication of the current resolution of sensor 104. As yet another example, every N-th word (e.g., every $5^{th}$ word) in the data stream 109 may contain an indication of the current resolution of sensor 104. As yet another example, the indication of the current resolution of sensor 104 may be spread out in multiple words. In the latter example, the indication of the current resolution of sensor 104 may be reconstituted by combining the contents of multiple words. In instances in which data stream 109 is formatted in accordance with the AK protocol, bits 5, 6, and 7 (which are designated as freely-assignable) may be utilized to encode the indication of the current resolution of sensor 104. It will be understood that the present disclosure is not limited to any specific method for encoding the current resolution of sensor 104 by using the data pulses $T_D$.

As noted above, the speed of target 103 is encoded in the frequency of the speed pulses $T_S$. The discussion that follows provides an example of the relationship between the frequency of the speed pulses $T_S$ and the speed of target 103, at different resolutions of the sensor 104.

FIG. 3A shows a table 302, which provides an example of the relationship between the frequency of the speed pulses $T_S$ and the speed of target 103 when the current resolution of sensor 104 is the 2× resolution. Under the nomenclature of the present disclosure, the 2× resolution is also referred to as "standard resolution". As can be readily appreciated, the number of pole pairs in target 103 may vary depending on the application. In this regard, it will be understood that Table 3 is provided only as an example, and the values in Table 3 may vary with the parameters of the target 103.

As illustrated by table 302, when the current resolution of sensor 104 is the 2× resolution, and the frequency of the speed pulses $T_S$ is 1800 Hz or under, this indicates that the speed of the target is 135 km/h or under. When the current resolution of sensor 104 is the 2× resolution, and the frequency of the speed pulses $T_S$ is between 1800 Hz and 2000 Hz, this indicates that the speed of the target is between 135 km/h and 150 km/h. When the current resolution of sensor 104 is the 2× resolution, and the frequency of the speed pulses $T_S$ is between 2000 Hz and 2200 Hz, this indicates that the speed of the target is between 150 km/h and 165 km/h. When the current resolution of sensor 104 is the 2× resolution, and the frequency of the speed pulses $T_S$ is between 2200 Hz and 2400 Hz, this indicates that the speed of the target is between 165 km/h and 180 km/h. When the current resolution of sensor 104 is the 2× resolution, and the frequency of the speed pulses $T_S$ is between 2400 Hz and 2800 Hz, this indicates that the speed of the target is between 180 km/h and 210 km/h. When the current resolution of sensor 104 is the 2× resolution, and the frequency of the speed pulses $T_S$ is between 2800 Hz and 3200 Hz, this indicates that the speed of the target is between 210 km/h and 240 km/h. When the current resolution of sensor 104 is the 2× resolution, and the frequency of the speed pulses $T_S$ is between 3200 Hz and 4000 Hz, this indicates that the speed of the target is between 240 km/h and 300 km/h. When the current resolution of sensor 104 is the 2× resolution, and the frequency of the speed pulses $T_S$ is between 4000 Hz and 5000 Hz, this indicates that the speed of the target is between 300 km/h and 375 km/h.

In another aspect, table 302 illustrates that the size of the words in data stream 109 may be inversely proportional to the frequency of the speed pulses $T_D$. When the frequency of the speed pulses $T_S$ is 1800 Hz or under, each word in the data stream may be 9 bits wide. When the frequency of the speed pulses $T_S$ is between 1800 Hz and 2000 Hz, each word in the data stream may be 8-bits wide. When the frequency of the speed pulses $T_S$ is between 2000 Hz and 2200 Hz, each word in the data stream may be 7-bits wide. When the frequency of the speed pulses $T_S$ is between 2200 Hz and 2400 Hz, each word in the data stream may be 6-bits wide. When the frequency of the speed pulses $T_S$ is between 2400 Hz and 2800 Hz, each word in the data stream may be 5-bits wide. When the frequency of the speed pulses $T_S$ is between 2800 Hz and 3200 Hz, each word in the data stream may be 4-bits wide. When the frequency of the speed pulses $T_S$ is between 3200 Hz and 4000 Hz, each word in the data stream may be 3-bits wide. When the frequency of the speed pulses $T_S$ is between 4000 Hz and 5000 Hz, each word in the data stream may be 2-bits wide.

In one respect, the relationship between the frequency of the speed pulses $T_S$ and target speed that is shown in table 302 is the same as the relationship that is standard for the AK-protocol. Similarly, the relationship between the frequency of the speed pulses $T_S$ and word size is standard for the AK-protocol. In this regard, according to the example of FIG. 3A, when the current resolution of sensor 104 is the 2× resolution, one can determine the speed of target 103 in the same manner as it is done in devices that support the AK-protocol. However, it will be understood that FIG. 3A is provided as an example only, and the present disclosure is not limited to any specific relationship between the frequency of the speed pulses $T_S$ and speed.

FIG. 3B shows a table 304 which illustrates an example of the frequency of the speed pulses $T_S$ and the speed of rotation of target 103. FIG. 3B illustrates that when the speed pulses $T_S$ have a frequency F, the speed of target 103 may be determined in accordance with equation 1 below:

$$currentSpeed = \frac{standardSpeed(F)}{\frac{R}{2}} \quad (1)$$

where, F is the frequency of the speed pulses $T_S$, standardSpeed(F) is the speed that would correspond to the frequency F if the current resolution of sensor 104 were the 2× resolution and R is the identifier of the current resolution of sensor 104. As noted above, the value of $$\frac{R}{2}$$

is referred to as "the factor of resolution R". The function called standardSpeed may be the same as the function that is illustrated in tabular form in FIG. 3A.

As indicated by table 304, when sensor 104 is operating at higher resolution (e.g., 32×), the same frequency of speed pulses $T_S$ would encode a much lower speed of target 103 than if the current resolution of sensor 104 was the standard resolution. However, at higher resolutions, the frequency of the speed pulses $T_S$ would indicate the actual position (and speed) of target 103 with a higher precision than when the current resolution of sensor 104 is the standard resolution.

The switch between different resolutions in sensor 104 may be driven by changes in the frequency of signal 119A (i.e., the same signal that is used to generate speed pulses $T_S$) and/or any signal that is indicative of the speed of the target 103 (e.g., signal 119B, etc.). In general, the lower the speed of target 103 (and/or the lower the frequency of signal 119A), the higher the resolution of sensor 104. A higher resolution of sensor 104 may be desirable for lower wheel speed in order to better facilitate the operation of autonomous features, such as self-parking. As discussed above, the higher the resolution of sensor 104 the greater the accuracy with which the position of target 103 can be determined based on the output of sensor 104. High accuracy in measuring the position of mechanical elements, such as wheel 102, could contribute to a vehicle or other machinery executing more precise and delicate actions.

FIG. 4 shows a table 400, which shows an example of the relationship between different frequencies of signal 119A and the current resolution of sensor 104. As illustrated, when the frequency of signal 119A is in the range of 0-49 Hz (or when the speed of target 103 is in a first speed range), the current frequency of sensor 104 may be the 64× resolution; when the frequency of signal 119A is in the range of 50-99 Hz (or when the speed of target 103 is in a second speed range), the current frequency of sensor 104 may be the 32× resolution; when the frequency of signal 119A is in the range of 100-199 Hz (or when the speed of target 103 is in a third speed range), the current frequency of sensor 104 may be the 16× resolution; when the frequency of signal 119A is in the range of 200-399 Hz (or when the speed of target 103 is in a fourth speed range), the current frequency of sensor 104 may be the 8× resolution; when the frequency of signal 119A is in the range of 400-799 Hz (or when the speed of target 103 is in a fifth speed range), the current frequency of sensor 104 may be the 4× resolution; when the frequency of signal 119A is greater than 800 Hz (or when the speed of target 103 is in a fifth speed range), the current frequency of sensor 104 may be the 2× resolution. According to the present example, the first speed range is lower than the second speed range; the second speed range is lower than the third speed range; the third speed range is lower than the fourth speed range; and the fifth speed range is lower than the sixth speed range. In some implementations, the relationship between speed of target 103 (or frequency of signal 119A) and resolution may be selected in such a way so as to ensure a word size that is sufficiently large to accommodate an indication of the current resolution of sensor 104.

FIG. 5A is a graph 500 illustrating an example of a method for generating the speed pulses $T_S$ when the current resolution of sensor 104 is the 16× resolution. FIG. 5A illustrates that in some implementations, processing circuitry 120 may be configured to monitor signal 119A and generate a speed pulse $T_S$ every time the phase of signal 119A changes by a predetermined phase gap value PG that corresponds to the current resolution of sensor 104. The phase gap value PG may be determined according to equation 2 below:

$$PG = \frac{360}{R} \quad (2)$$

where R is the identifier of the current resolution of sensor 104.

Figure 5B:
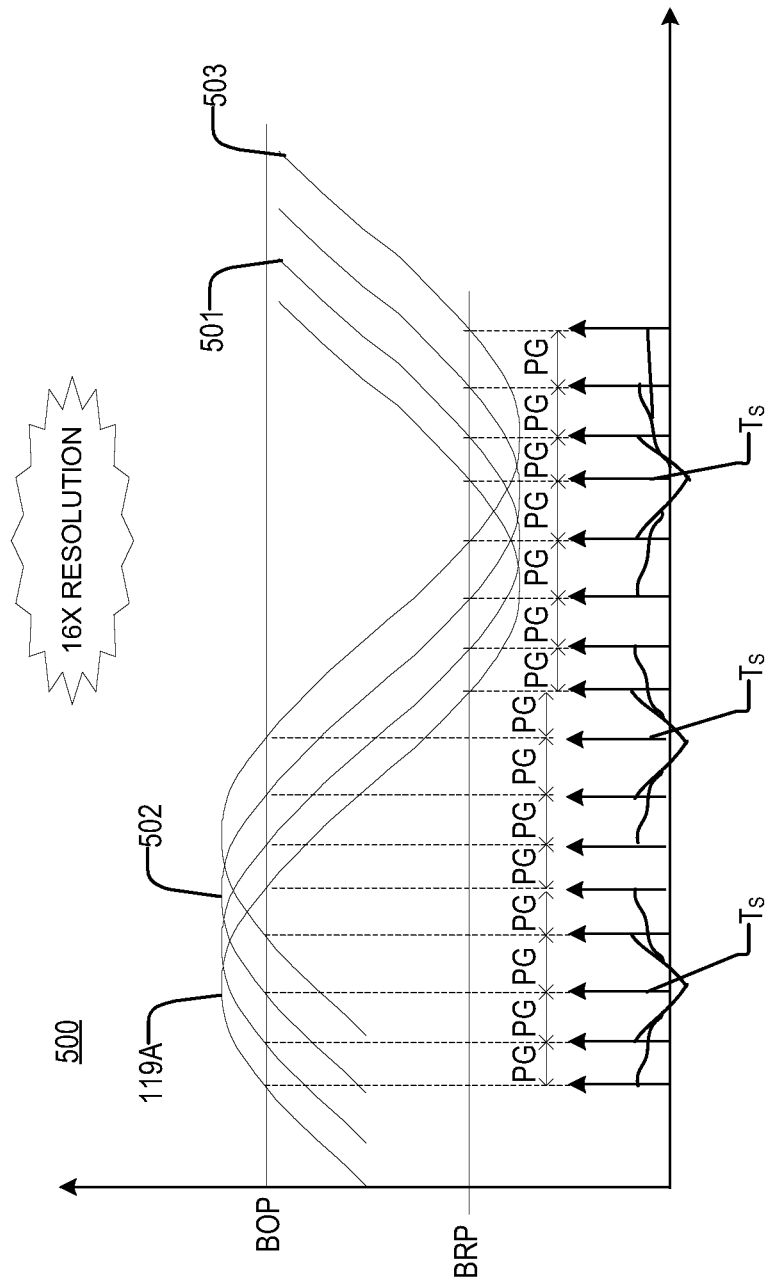
FIG. 5B is a graph illustrating an example of a data stream that is transmitted by the sensor of FIG. 1C, according to aspects of the disclosure.

FIG. 5B is a graph 500 illustrating an example of a method for generating the speed pulses $T_S$ when the current resolution of sensor 104 is the 16× resolution. Shown in FIG. 5 is a plot of signal 119A, as well as plots of signals 501-503. Further shown in FIG. 5B is a plot of the speed pulses $T_S$. In some respects, the method discussed with respect to FIG. 5B causes processing circuitry 120 to generate a speed pulse $T_S$ every time the phase of signal 119A changes by a predetermined phase gap value PG.

According to the present example, signal 501 is off-phase from signal 119A by the phase gap value PG, signal 502 is off-phase from signal 501 by the phase gap value PG, and signal 502 is off-phase from signal 503 by the phase gap value PG. Under the nomenclature of the present disclosure, signal 119A is referred to as a "main signal" and signals 501-503 are referred to as additional signals. The term "virtual signal" as used herein refers to a signal that is generated by shifting the phase of another signal. According to present example, signals 501-503 are virtual signals that are generated by shifting the phase of signal 119A. Alternative implementations are possible in which signal 119B is used in place of one of signals 501-503.

According to the present example, the speed pulses are generated by using a comparator with hysteresis, which has thresholds Bop and Brp. According to the present example, the comparator is configured to generate a speed pulse $T_S$ every time one of signals 119A and 501-503 crosses either one of the thresholds Bop and Brp. Although, in the present example, a single comparator is used, alternative implementations are possible in which more than one comparator is used. In this regard, it will be understood that the present disclosure is not limited to using any specific type of circuitry to generate the speed pulses $T_S$ for as long as the circuitry used is configured to generate a pulse $T_S$ every time each of signals 119A and 501-503 crosses one of the thresholds Bop and Brp. In some implementations, each of the signals 501-503 may be generated by processing circuitry 120. Additionally or alternatively, the comparators or other circuitry that generates the speed pulses $T_S$ may also be part of processing circuitry 120.

In some implementations, the number of additional signals, in addition to signal 119B, that are needed to generate the speed pulses $T_S$ for a given resolution of sensor 104 can be determined in accordance with equation 3 below:

$$NS = \frac{R}{4} - 1 \quad (3)$$

where NS is the number of additional signals and R is the identifier of the given resolution.

In some implementations, for any given resolution of sensor 104, the phase offset between signal 119A and any one of the additional signals may be determined in accordance with equation 4 below:

$$PO_i - i\frac{360}{R} \quad (4)$$

where $PO_i$ is the number of additional signals, R is the given resolution. In the example of FIG. 5B, signal 501 would have an index i=1, signal 502 would have an index i=2, and signal 503 would have an index i=3.

Figure 6A:
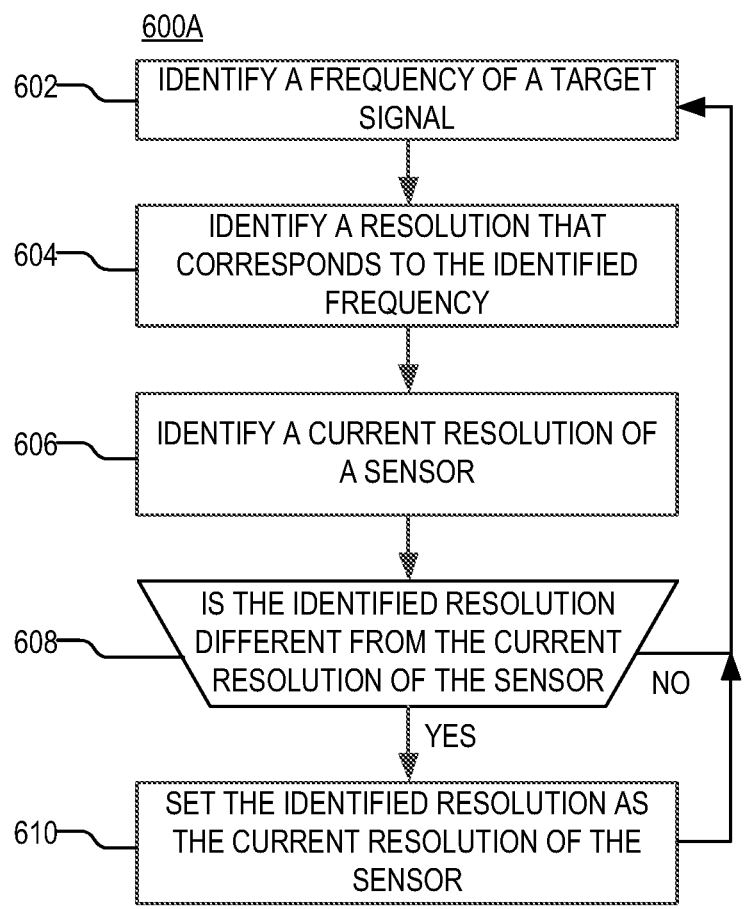
FIG. 6A is a flowchart of an example of a process, according to aspects of the disclosure.

FIG. 6A is a flowchart of an example of a process 600A, according to aspects from the disclosure.

At step 602, processing circuitry 120 identifies a frequency of a target signal. The target signal may be any signal that is generated at least in part by one or more of magnetic field sensors 112A-B and 114A-B. Additionally or alternatively in some implementations, the target signal may be any signal whose frequency is at least in part, indicative of the speed for rotating target 103. According to the present example, the target signal is signal 119A. However, alternative implementations are possible in which the target signal 119B or another signal.

At step 604, processing circuitry 120 identifies a resolution that corresponds to the identified frequency. In some implementations, the resolution may be identified by using table 400 (shown in FIG. 4) and/or a data structure that is stored in memory 122 which contains the same information as table 400.

At step 606, processing circuitry 120 identifies the current resolution of sensor 104. According to the present example, processing circuitry 120 retrieves the value of variable 124 (shown in FIG. 1C) to identify the current resolution of sensor 104.

At step 608, processing circuitry 120 determines if the resolution identified at step 604 is the same as the current resolution of sensor 104. If both resolutions are the same, process 120 returns to step 602. Otherwise, if the resolution identified at step 604 is different from the current resolution of sensor 104, process 600A proceeds to step 610.

At step 610, processing circuitry 120 sets the resolution identified at step 602 as the current resolution of sensor 104. According to the present example, processing circuitry 120 sets the value of variable 124 (shown in FIG. 1C) to a value that corresponds to the resolution identified at step 604, thereby causing variable 124 to indicate that the resolution identified at step 604 is now the current resolution of sensor 104.

Figure 6B:
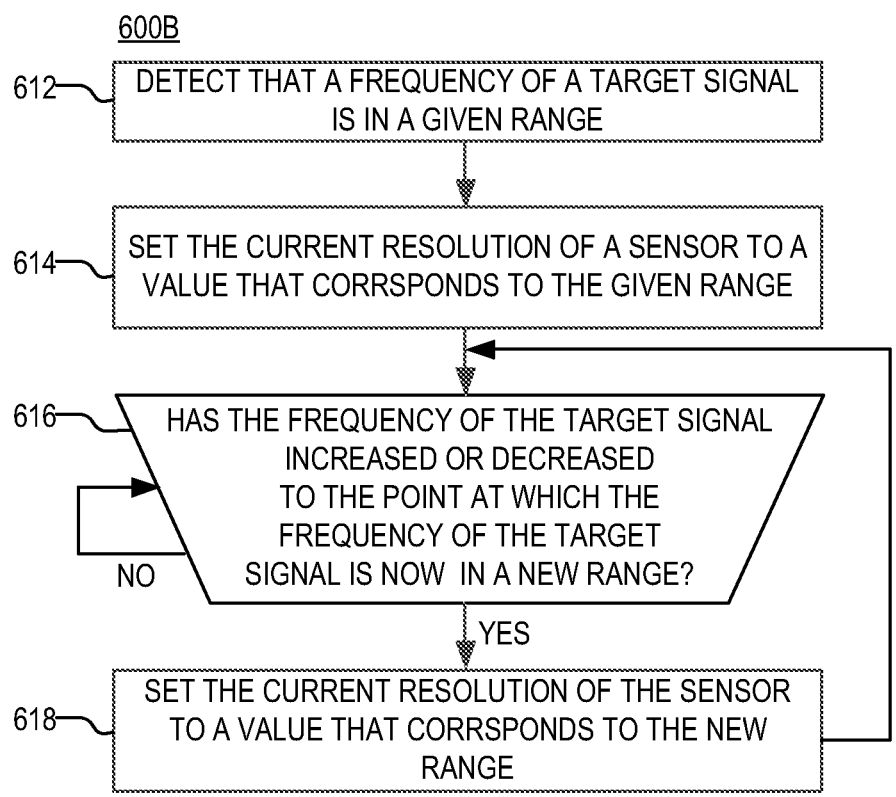
FIG. 6B is a flowchart of an example of a process, according to aspects of the disclosure.

FIG. 6B is a flowchart of an example of a process 600B, according to aspects of the disclosure.

At step 612, processing circuitry 120 detects that the frequency of a target signal is in a given frequency range. The target signal may be any signal that is generated at least in part by one or more of magnetic field sensors 112A-B and 114A-B. Additionally or alternatively, in some implementations, the target signal may be any signal whose frequency is at least in part, indicative of the speed for rotating target 103. According to the present example, the target signal is signal 119A. However, alternative implementations are possible in which the target signal 119B or another signal. The given frequency range may be one of the frequency ranges that are defined in table 400 (shown in FIG. 4) and/or a data structure that is stored in memory 122 which contains the same information as table 400.

At step 614, processing circuitry 120 sets the current resolution of sensor 104 to a value that corresponds to the given frequency range. To perform step 614, processing circuitry may use table 400 (or a commensurate data structure) to identify a resolution that corresponds to the given frequency range. Afterwards, processing circuitry 120 may update the value of variable 124 to indicate that the identified resolution is now the current resolution of sensor 104. In some implementations, updating the value of variable 124 may include setting variable 124 to equal the identifier of the resolution that corresponds to the given frequency range.

At step 616, processing circuitry 120 determines if the frequency of the target signal has increased or decreased to the point at which the frequency is now in a new frequency range. The new frequency range may be another one of the frequency ranges that are defined in table 400 (shown in FIG. 4.)

At step 618, processing circuitry 120 sets the current resolution of sensor 104 to a value that corresponds to the new frequency range. To perform step 614, processing circuitry may use table 400 (shown in FIG. 4) to identify a resolution that corresponds to the new frequency range. Afterwards, processing circuitry 120 may update the value of variable 124 to indicate that the identified resolution is now the current resolution of sensor 104. In some implementations, updating the value of variable 124 may include setting variable 124 to equal the identifier of the resolution that corresponds to the new frequency range.

Figure 7:
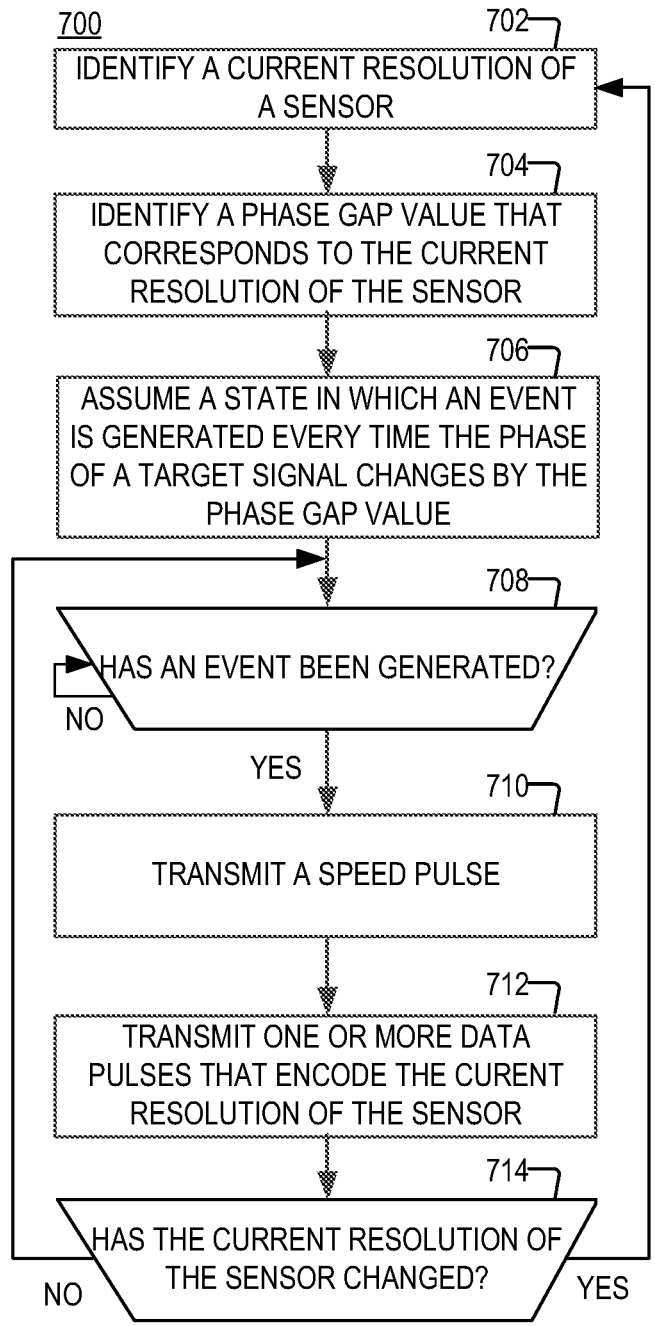
FIG. 7 is a flowchart of an example of a process, according to aspects of the disclosure.

FIG. 7 is a diagram of an example of a process 700, according to aspects of the disclosure. In some implementations, process 700 may be executed concurrently with one of processes 600A and 600B, which are discussed above with respect to FIGS. 6A-B.

At step 702, processing circuitry 120 identifies the current resolution of sensor 104. According to the present example, processing circuitry 120 retrieves the value of variable 124 (shown in FIG. 1C) to identify the current resolution of sensor 104.

At step 704, processing circuitry 120 identifies a phase gap value PG that corresponds to the current resolution. In one example, the phase gap value may be obtained by using equation 2, which is discussed above with respect to FIGS. 5A-B.

At step 706, processing circuitry 120 assumes a state in which it generates an event every time the phase of a target signal changes by the phase gap value. According to the present example the target signal is signal 119A. When the current resolution of sensor 104 is the 2× resolution, processing circuitry 120 may assume a state in which it generates an event when the target signal crosses a predetermined threshold that corresponds to the phase gap value. If the current resolution of sensor 104 is the 4× resolution, processing circuitry 120 may assume a state in which it generates an event every time the target signal crosses either one of two different thresholds (e.g., see threshold Bop and Brp which are shown in FIG. 5B). If the current resolution of sensor 104 is higher than the 4× resolution (e.g., 8×, 16, 32×, or 64×, etc), processing circuitry 120 may assume a state in which it (i) interpolates the target signal into one or more additional signals based on the phase gap value (see FIG. 5B), and (ii) and generates an event every time the target signal or any of the additional signals crosses one of a pair of thresholds (e.g., see threshold Bop and Brp which are shown in FIG. 5B). If the current resolution of sensor 104 is higher than the 4× resolution (e.g., 8×, 16, 32×, or 64×, etc). In some implementations, the number of additional signals that need to be generated may be determined in accordance with equation 3, which is discussed above with respect to FIG. 5B. In some implementations, as illustrated by equation 4, each of the additional signals may be offset from the target signal by a multiple of the phase gap value (determined at step 704). As noted above, the phase offset of each of the additional signals from the target signal may be determined in accordance with equation 4, which is discussed above with respect to FIG. 5B. In some implementations, each of the additional signals may be generated by shifting the phase of the target signal.

At step 708, processing circuitry 120 waits until an event is generated. When an event is generated, process 700 proceeds to step 710.

At step 710, processing circuitry 120 transmits a speed pulse $T_S$ to ECU 106.

At step 712, processing circuitry 120 transmits one or more data pulses $T_D$. As noted above, the transmitted data pulses $T_D$ may encode an indication of the current resolution of sensor 104. In some implementations, at least some of the transmitted data pulses $T_D$ may encode the identifier of the current resolution.

At step 714, processing circuitry 120 detects of the current resolution of sensor 104. If the current resolution of sensor 104 has changed, process 700 returns to step 702. Otherwise, if the current resolution of sensor 104 remains the same, process 700 returns to step 708.

Figure 8:
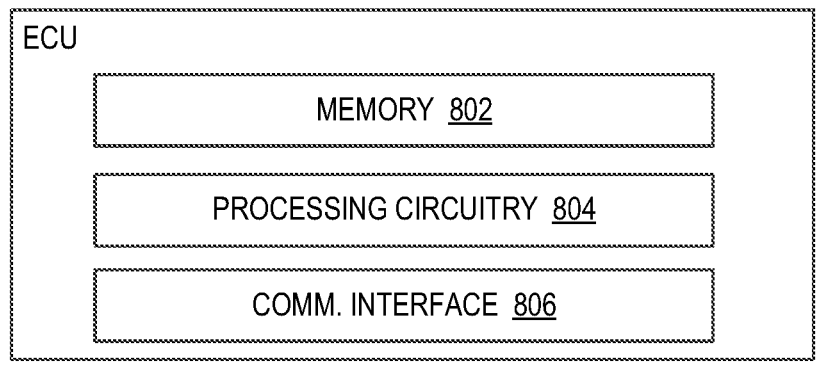
FIG. 8 is a diagram of an example of an electronic control unit, according to aspects of the disclosure.

FIG. 8 is a diagram of an example of ECU 106, according to aspects of the disclosure. As illustrated, ECU 106 may include a memory 802, processing circuitry 804, and a communications interface 806. The memory 802 may include any suitable type of volatile or non-volatile memory. For example, the memory 802 may include a solid-state drive (SSD), a hard disk (HD), a random-access memory (RAM), Synchronous Dynamic Random-Access Memory (SDRAM), etc. The processing circuitry 804 may include any suitable type of processing circuitry, such as one or more general-purpose processors (e.g., x86 processor, MIPS processor, ARM processor, etc.), special-purpose processors, application-specific integrated circuits (ASICs), field-programmable gate arrays (FPGAs), etc. The communications interface 806 may include any suitable type of communications interface, such as one or more serial communications interfaces, parallel communications interfaces, Ethernet adapters, or wireless data interfaces.

Figure 9:
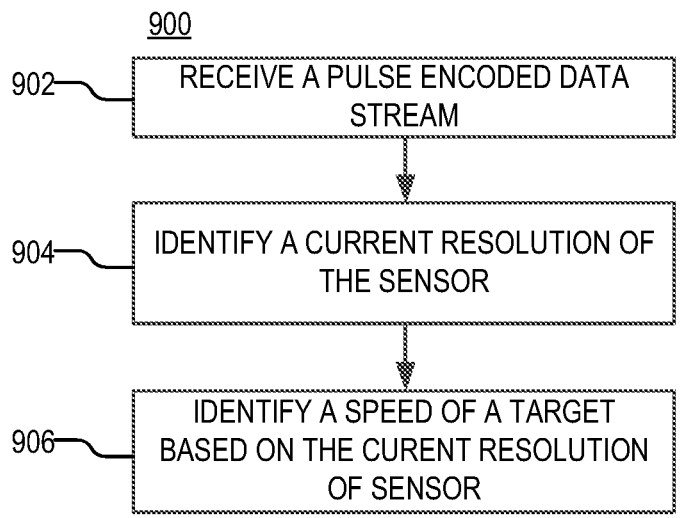
FIG. 9 is a flowchart of an example of a process, according to aspects of the disclosure.

FIG. 9 is a flowchart of an example of a process 900, according to aspects of the disclosure.

At step 902, ECU 106 receives the data stream 109 from sensor 104. As noted above, the data stream 109 may include a plurality of speed pulses $T_S$ and a plurality of words of data pulses $T_D$. As noted above, the speed pulses $T_S$ may indicate the speed of target 103 and the data pulses may indicate the current resolution of sensor 104 (and possibly other information, such as direction of rotation of target 103).

At step 904, ECU 106 identifies the current resolution of sensor 104 based on one or more of the words in the data stream. As noted above, the words in the data stream may encode an indication of the current resolution of sensor 104. In some implementations, the indication may be the identifier of the current resolution of sensor 104 that is contained in one or more of the words of the data stream 109.

At step 906, ECU 106 identifies the current speed of target 103 based on the resolution that is identified at step 904. In some implementations, the current speed of target 103 may be determined in accordance with equation 5 below:

$$v = \frac{v_s}{f} \quad (5)$$

where v is the speed of the target, $v_s$ is a speed corresponding to a frequency of the plurality of speed pulses in standard resolution mode, and f is the factor corresponding to the current resolution of the sensor. As discussed above, the factor corresponding to the current resolution is equal to the identifier of the current resolution divided by two, and the identifier of the current resolution is equal to the count of pulses that are generated in each period of a target signal (e.g., signal 119A). The standard resolution mode of sensor 104 is the 2× resolution. In some implementations, the value of $v_s$ may be determined by using the same methods that are used to determine speed based on standard AK-protocol signals. In some implementations, ECU 106 may use the current speed of the target to control one or more components of vehicle 100. For example, ECU 106 may apply the brakes of vehicle 100, throttle the engine of vehicle 100, and/or perform any other suitable action.

Although in the example of FIG. 9 the current speed of target 103 is determined, alternative implementations are possible in which the current position of the target 103 is determined based on the data stream. As can be readily appreciated, each speed pulse $T_S$ may correspond to a particular angular displacement of target 103. The size of the angular displacement may be inversely proportional to the current resolution of sensor 104, such that the larger the resolution, the lower the displacement that corresponds to each pulse $T_S$. After the position of target 103 is determined, the determined composition may be used by ECU 106 to apply the brakes of vehicle 100, throttle the engine of vehicle 100, and/or perform any other suitable action.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the term "magnetic-field sensor" is used to describe a circuit that uses a magnetic field sensing element, generally in combination with other circuits. Magnetic-field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic-field sensor is used in combination with a back-biased or other magnet, and a magnetic-field sensor that senses a magnetic-field density of a magnetic field.

As used herein, the term "magnetic-field sensing element" is used to describe a variety of electronic elements that can sense a magnetic field. The magnetic-field sensing element can be, but is not limited to, a Hall Effect element a magnetoresistance element, a magnetotransistor or an inductive coil. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims. (-)

The invention claimed is:

1. A method for use in a sensor, the method comprising:
detecting that a frequency of a first signal is in a first range, the first signal being generated, at least in part, by one or more first magnetic field sensing elements, the first signal being generated in response to a magnetic field that is associated with a rotating target, the rotating target including a plurality of pole pairs;
identifying a first resolution that corresponds to the first range and causing the first resolution to become a current resolution of the sensor; and
transmitting a data stream in accordance with the current resolution of the sensor,
wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and
wherein the current resolution of the sensor specifies a count of speed pulses that are transmitted for each pole pair of the rotating target.

2. The method of claim 1, further comprising:
detecting that the frequency of the first signal has increased and is now in a second range; and
identifying a second resolution that corresponds to the second range and causing the second resolution to become the current resolution of the sensor,
wherein the second resolution is characterized by a lower count of speed pulses being transmitted for each pole pair of the rotating target than the first resolution.

3. The method of claim 1, further comprising:
detecting that the frequency of the first signal has decreased and is now in a second range; and
identifying a second resolution that corresponds to the second range and causing the second resolution to become the current resolution of the sensor,
wherein the second resolution is characterized by a greater count of speed pulses being transmitted for each pole pair of the rotating target than the first resolution.

4. The method of claim 1, wherein the one or more first magnetic field sensing elements include at least one of a Hall element, a Giant magnetoresistance (GMR) element, or a tunneling magnetoresistance (TMR) element.

5. The method of claim 1, wherein transmitting the plurality of speed pulses includes transmitting a respective speed pulse every time a phase of the first signal changes by a phase gap value, the phase gap value corresponding to the current resolution of the sensor.

6. The method claim 5, further comprising identifying the phase gap value based on the current resolution of the sensor.

7. The method claim 1, wherein transmitting the plurality of speed pulses includes transmitting a respective speed pulse every time the first signal crosses each of a set of one or more thresholds.

8. The method claim 1, wherein transmitting the plurality of speed pulses includes transmitting a respective speed pulse every time a second signal crosses each of a set of one or more thresholds, the second signal being generated, at least in part, by one or more second magnetic field sensing elements, the second signal being generated in response to the magnetic field associated with the rotating target.

9. The method of claim 1, wherein:
transmitting the plurality of speed pulses includes transmitting a respective speed pulse every time each of a main signal and one or more additional signals crosses each of a set of one or more thresholds,
the main signal being either the first signal or a second signal that is generated, at least in part, by one or more second magnetic field sensing elements in response to the magnetic field associated with the rotating target, and
each of the additional signals has a same frequency as the main signal and a phase that is offset from the main signal by a different amount.

10. The method of claim 1, wherein the frequency of the first signal is proportional to the speed of the rotating target.

11. The method of claim 1, wherein the first resolution specifies a count of speed pulses that are transmitted for each period of the first signal.

12. A sensor, comprising:
one or more first magnetic field sensing elements configured to generate, at least in part, a first signal in response to a magnetic field that is associated with a rotating target, the rotating target including a plurality of pole pairs; and a processing circuitry configured to: detect that a frequency of the first signal is in a first range; identify a first resolution that corresponds to the first range and cause the first resolution to become a current resolution of the sensor; and transmit a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

13. The sensor of claim 12, wherein the processing circuitry is further configured to: detect that the frequency of the first signal has increased and is now in a second range, identify a second resolution that corresponds to the second range, and cause the second resolution to become the current resolution of the sensor, the second resolution being characterized by a lower count of speed pulses being transmitted for each pole pair of the rotating target than the first resolution.

14. The sensor of claim 12, wherein the processing circuitry is further configured to: detect that the frequency of the first signal has decreased and is now in a second range; identify a second resolution that corresponds to the second range and cause the second resolution to become the current resolution of the sensor, the second resolution being characterized by a greater count of speed pulses being transmitted for each pole pair of the rotating target than the first resolution.

15. The sensor of claim 12, wherein the one or more first magnetic field sensing elements include at least one of a Hall element, a Giant magnetoresistance (GMR) element, or a tunneling magnetoresistance (TMR) element.

16. The sensor of claim 12, wherein transmitting the plurality of speed pulses includes transmitting a respective speed pulse every time a phase of the first signal changes by a phase gap value, the phase gap value corresponding to the current resolution of the sensor.

17. The sensor of claim 16, the processing circuitry is further configured to identify the phase gap value based on the current resolution of the sensor.

18. The sensor of claim 12, wherein transmitting the plurality of speed pulses includes transmitting a respective speed pulse every time the first signal crosses each of a set of one or more thresholds.

19. The sensor of claim 12, further comprising one or more second magnetic field sensing elements that are configured to generate, at least in part, a second signal in response to the magnetic field associated with the rotating target, wherein transmitting the plurality of speed pulses includes transmitting a respective speed pulse every time the second signal crosses each of a set of one or more thresholds.

20. The sensor of claim 12, wherein:

transmitting the plurality of speed pulses includes transmitting a respective speed pulse every time each of a main signal and one or more additional signals crosses each of a set of one or more thresholds, the main signal being either the first signal or a second signal that is generated, at least in part, by one or more second magnetic field sensing elements in response to the magnetic field associated with the rotating target, and each of the additional signals has a same frequency as the main signal and a phase that is offset from the main signal by a different amount.

21. The sensor of claim 12, wherein the frequency of the first signal is proportional to the speed of the rotating target.

22. The sensor of claim 12, wherein the first resolution specifies a count of speed pulses that are transmitted for each period of the first signal.

23. A sensor comprising:

means for detecting that a frequency of a first signal is in a first range, the first signal being generated, at least in part, by one or more first magnetic field sensing elements, the first signal being generated in response to a magnetic field that is associated with a rotating target, the rotating target including a plurality of pole pairs;

means for identifying a first resolution that corresponds to the first range and causing the first resolution to become a current resolution of the sensor; and means for transmitting a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

24. The sensor of claim 23, further comprising:

means for detecting that the frequency of the first signal has increased and is now in a second range; and means for identifying a second resolution that corresponds to the second range and causing the second resolution to become the current resolution of the sensor, wherein the second resolution is characterized by a lower count of speed pulses being transmitted for each pole pair of the rotating target than the first resolution.

25. The sensor of claim 23, further comprising:

means for detecting that the frequency of the first signal has decreased and is now in a second range; and means for identifying a second resolution that corresponds to the second range and causing the second resolution to become the current resolution of the sensor, wherein the second resolution is characterized by a greater count of speed pulses being transmitted for each pole pair of the rotating target than the first resolution.

26. A non-transitory computer-readable medium, storing one or more processor-executable instructions, which, when executed by a processing circuitry of a sensor, causes the processing circuitry to:

detect that a frequency of a first signal is in a first range, the first signal being generated, at least in part, by one or more first magnetic field sensing elements, the first signal being generated in response to a magnetic field that is associated with a rotating target, the rotating target including a plurality of pole pairs;

identify a first resolution that corresponds to the first range and cause the first resolution to become a current resolution of the sensor; and transmit a data stream in accordance with the current resolution of the sensor, wherein transmitting the data stream includes: (i) transmitting a plurality of speed pulses that encode a speed of the rotating target, and (ii) transmitting a plurality of data pulse sets, each of the data pulse sets being transmitted between a different pair of consecutive ones of the plurality of speed pulses, at least some of the data pulse sets being arranged to encode an indication of the current resolution of the sensor, and wherein the current resolution of the sensor specifies a count of speed pulses that are transmitted for each pole pair of the rotating target.

27. The non-transitory computer-readable medium of claim 26, wherein the processing circuitry is further configured to: detect that the frequency of the first signal has increased and is now in a second range, identify a second resolution that corresponds to the second range and cause the second resolution to become the current resolution of the sensor, the second resolution being characterized by a lower count of speed pulses being transmitted for each pole pair of the rotating target than the first resolution.

28. The non-transitory computer-readable medium of claim 26, wherein the processing circuitry is further configured to: detect that the frequency of the first signal has decreased and is now in a second range, identify a second resolution that corresponds to the second range, and cause the second resolution to become the current resolution of the sensor, the second resolution being characterized by a greater count of speed pulses being transmitted for each pole pair of the rotating target than the first resolution.

* * * * *